Nov. 11, 1952  B. J. BRANDER  2,617,182
MOTOR-DRIVEN RAZOR
Filed Feb. 25, 1948

Inventor
Bertil J. Brander

Patented Nov. 11, 1952

2,617,182

UNITED STATES PATENT OFFICE 2,617,182

MOTOR-DRIVEN RAZOR

Bertil Johan Brander, Stockholm, Sweden

Application February 25, 1948, Serial No. 10,757
In Sweden January 31, 1946

Section 1, Public Law 690, August 8, 1946
Patent expires January 31, 1966

2 Claims. (Cl. 30—43)

This invention relates to motor driven razors using a rotatable cutter fixed to the shaft of an electric motor and sliding on the inside of a perforated plate or grill for shearing off the hairs projecting through the apertures of the grill. In this type of electric razors the cutter is generally enclosed in a cutter head fixed to the handle or body of the electric motor.

The object of the invention is to provide a simplified construction of the cutter head for this type of electric razor, making it more comfortable to use, particularly respecting the removal of the cut-off hairs from the inside of the cutter head, and at the same time considerably reducing the cost of manufacture of the razor.

To attain this object the cutter head is carried out as a telescope-like combination of two concentric tubular members or sleeves, one of which is fixed to the handle or motor body, and forms a receptacle for the cut-off hairs and is provided with lateral outlets for same, while the other sleeve is designed as a combined rotatable grill holder and shutter adapted to close and open the outlets of the fixed sleeve. In addition to the foregoing objects the rotatable grill holder provides the additional advantage that it can be utilized as a motor starting device as set forth hereinafter.

Figure 1:
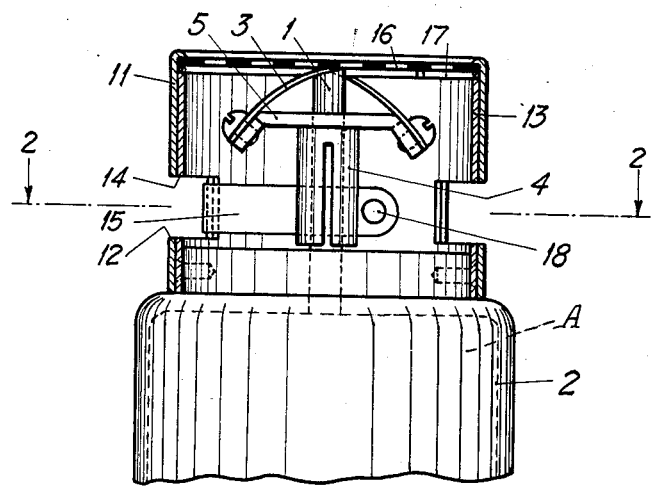
Figure 2:
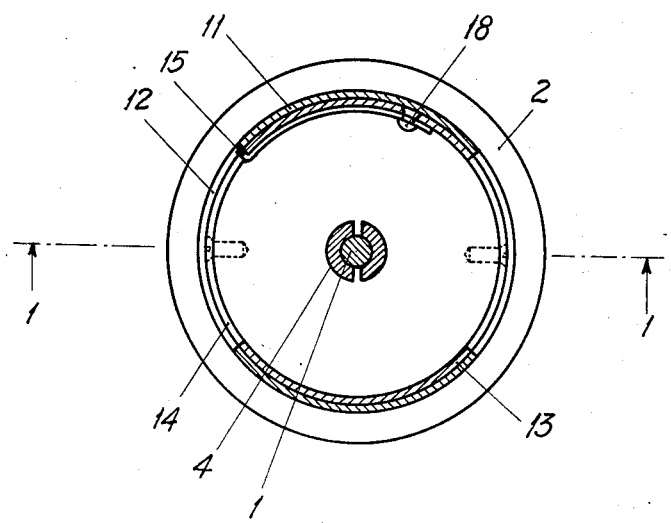

The invention will now be described with respect to the accompanying drawings in which;

Figure 1 discloses a longitudinal partial view partly in section along lines 1—1 of Figure 2 of an electric razor according to the invention, and Figure 2 is a transverse sectional view taken along lines 2—2 of Figure 1.

In the drawing the body of the electric razor 2 houses the motor A and projecting externally of one end of the body is the driving shaft 1 to which is secured a cutting member comprising two resilient steel blades 3, each blade being fixed to an arm of a two-armed blade carrier 5 which by means of a split sleeve 4 is secured to the motor shaft 1. Two concentric tubular members 11 and 13 provide an enclosure around the cutter member. The inner tubular member 13 being fixed to the body 2 and provided with lateral apertures 14 on opposite sides of the axis of the shaft 1 and substantially coextensive in length with one another. As indicated, the tubular members 11 and 13 are respectively substantially coextensive in length and the inner tubular member extends beyond the motor body 2 a distance at least sufficient to encompass the blades of the cutter member so that the inner tubular member not only constitutes a receptacle for the cut-off hairs but also defines a protecting shield surrounding the blades so as to prevent damage thereto when the outer tubular member 11 is removed. The outer tubular member 11 is loose with respect to and fits around the inner tubular member 13 and is provided with lateral apertures 12 which by rotation of the outer tubular member 11 may be aligned with the apertures 14 in a fixed inner tubular member 13. At the outer end of the movable tubular member 11 is mounted the perforated shear plate or protective grill 16. As indicated, the outer end of the movable tubular member is provided with an inturned flange, the shear plate being placed against this flange and retained in position thereagainst by means of an annular spring 17 of tensioned steel wire.

For the purpose of limiting the rotatable movement of the outer tubular member 11 and also to limit the axial outward movement of the same there is provided a curved flat spring 15 fixed by means of a rivet 18 on the inside of the fixed tubular member 13. This spring is provided with an outturned end as illustrated in Figure 2 which has an extent greater than the thickness of at least one of the tubular members so that this outturned end projects through one of the lateral apertures of the inner tubular member and at least within the confines of an aperture of the outer tubular member 11. This outturned end thereby provides a stop for limiting the rotatable movement in either direction of the movable tubular member 11 relative to the fixed tubular member 13.

The cutting of the beard is performed in a known manner, the resiliency of the blades 3 insuring that the blades press against and cooperate with the protective grill or shear plate. The cuttings of the beard that pass inside the fixed tubular member 13 are emptied when necessary by aligning the apertures 12 and 14 by rotating the outer tubular member relative to the inner tubular member.

It is therefore seen that the outer tubular member 11 constitutes a revolvable combined grill holder and shutter for opening and closing the outlets of the cutter head and such structure is obviously an important component in the economic construction of an electric razor of this type since it renders it possible to produce such an article with few very simple component parts requiring a minimum of material and labor. The resulting article has a low cost of manufacture and one in which the weight of the cutting head is reduced to a minimum which is a decided advantage for the user.

The cutter head of the described razor may be modified in some details within the scope of the invention. For example, the grill carrying sleeve may be arranged inside, instead of outside the fixed sleeve if the former is provided with a brim at its outer end, by means of which it may be grasped for turning.

Having now described my invention, what I claim as new and desire to secure by Letters Patent is:

1. An electric razor comprising a body, an electric motor incorporated therewith, a shaft driven by the motor and projecting beyond the body, a cutter comprising resilient blades carried by said shaft, a cutter head comprising a telescope-like combination of two concentric laterally apertured tubular members, the outer member being axially and rotatably movably mounted on the inner member, a grill member constituting a stationary shear plate carried by the outer end of said outer member, the said blades being constantly pressed against and cooperating with the grill member during cutting and the apertures in the movable outer member being alignable with the apertures in the fixed inner member whereby the outer member constitutes a combined removable and revolvable grill holder and shutter for the outlets of the cutter head, and a latch spring having an outturned free end of greater length than the thickness of the inner tubular member, said spring being mounted within the inner tubular member with the free end projecting through an aperture therein and extending at least within an aperture of the outer tubular member so as to retain the outer tubular member and the grill carried thereby in operative position against the outward pressure of the cutter blades and also to constitute a stop limiting the roation of the outer grill carrying member.

2. An elecric razor comprising a body, an electric motor incorporated therewith, a motor shaft projecting beyond the body, a cutter carried by the motor shaft and comprising two arms each extending perpendicular to the axis of the shaft and projecting oppositely outwardly thereof, a flexible blade carried by each arm, a cutter head comprising concentric tubular sleeves, each of said sleeves having apertures in the walls thereof disposed at respective equal distances from the inner ends of the sleeves, one of said sleeves being fixed to the body and the other sleeve being slidably mounted with respect to the first mentioned sleeve whereby rotative movement of the slidable sleeve aligns the apertures in the respective sleeves, both said sleeves projecting beyond the body a distance sufficient to encompass the blades of the cutters so as to provide a protective shield around the cutter, the movable shield having an inturned flange at the outer end thereof, a stationary apertured shear plate within the said movable sleeve and against the inner surface of the said inturned flange, spring means retaining said shear plate in position, and a latch spring carried by one of said sleeves and having a laterally projecting end, said end having a length greater than the thickness of at least one of said sleeves and projecting through one of the apertures in the sleeve to which the spring is mounted and extending at least within the confines of an aperture of the other sleeve, said spring limiting rotative movement of the slidable sleeve with respect to the fixed sleeve and further maintaining the inner surface of the shear plate in frictional contact with the resilient cutting blades, the resiliency of the latch spring permitting lateral movement thereof to uncouple the sleeves whereby the movable sleeve and the shear plate carried thereby can be removed from the razor.

BERTIL JOHAN BRANDER.

REFERENCES CITED

The following references are of record in the file of this patent:

UNITED STATES PATENTS

| Number | Name | Date |
|---|---|---|
| 2,077,805 | Muros | Apr. 20, 1937 |
| 2,280,052 | Bahr | Apr. 21, 1942 |
| 2,291,852 | Weatherford | Aug. 4, 1942 |

FOREIGN PATENTS

| Number | Country | Date |
|---|---|---|
| 69,780 | Norway | Nov. 26, 1945 |